US008816622B2

(12) United States Patent
Kato et al.

(10) Patent No.: US 8,816,622 B2
(45) Date of Patent: Aug. 26, 2014

(54) CONTROL APPARATUS FOR ROTATING MACHINE

(75) Inventors: Sho Kato, Tokyo (JP); Hisanori Yamasaki, Tokyo (JP); Keita Hatanaka, Tokyo (JP); Hidetoshi Kitanaka, Tokyo (JP); Yoshinori Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 13/809,215

(22) PCT Filed: Jul. 26, 2011

(86) PCT No.: PCT/JP2011/004194
§ 371 (c)(1),
(2), (4) Date: Jan. 9, 2013

(87) PCT Pub. No.: WO2012/014443
PCT Pub. Date: Feb. 2, 2012

(65) Prior Publication Data
US 2013/0106329 A1    May 2, 2013

(30) Foreign Application Priority Data
Jul. 27, 2010  (JP) ................................ 2010-168202

(51) Int. Cl.
*H02P 6/20* (2006.01)
(52) U.S. Cl.
USPC ............ 318/400.11; 318/400.02; 318/400.09; 318/400.13
(58) Field of Classification Search
USPC .............. 318/400.02, 400.09, 400.11, 400.13
See application file for complete search history.

(56) References Cited

U.S. PATENT DOCUMENTS

| 5,847,523 A * | 12/1998 | Rappenecker et al. ....... 318/434 |
| 8,022,660 B2 * | 9/2011 | Kinpara et al. ............... 318/812 |

(Continued)

FOREIGN PATENT DOCUMENTS

| JP | 2005 65410 | 3/2005 |
| JP | 2006-320039 | 11/2006 |

(Continued)

OTHER PUBLICATIONS

International Search Report Issued Nov. 1, 2011 in PCT/JP11/04194 Filed Jul. 26, 2011.

(Continued)

*Primary Examiner* — Paul Ip
(74) *Attorney, Agent, or Firm* — Oblon, Spivak, McClelland, Maier & Neustadt, L.L.P.

(57) ABSTRACT

A control apparatus for an AC rotating machine that can reliably and stably start up an AC rotating machine, particularly a synchronous motor using a permanent magnet, in position-sensorless vector control thereof, includes: a steady speed calculator that calculates, during steady state control of the AC rotating machine, a rotation angular frequency of the AC rotating machine based on an AC current and voltage commands; and a start-up speed calculator that calculates, during start-up control within a predetermined period after the AC rotating machine has been started up, the rotation angular frequency of the AC rotating machine based on the AC current and the voltage commands. The control apparatus corrects during the start-up control current commands so that the AC voltage amplitude of the voltage commands will be a constant value not more than the maximum output voltage of a power converter.

10 Claims, 4 Drawing Sheets

(56) References Cited

U.S. PATENT DOCUMENTS

| | | |
|---|---|---|
| 2008/0218111 A1 | 9/2008 | Okamura |
| 2009/0015182 A1* | 1/2009 | Kariatsumari et al. .. 318/400.02 |
| 2009/0160380 A1* | 6/2009 | Yamada et al. .......... 318/400.15 |
| 2009/0230901 A1* | 9/2009 | Amano ...................... 318/400.3 |
| 2009/0237021 A1* | 9/2009 | Yamamoto et al. ...... 318/400.15 |
| 2009/0237022 A1* | 9/2009 | Yamamoto et al. ...... 318/400.26 |
| 2009/0251083 A1* | 10/2009 | Kinpara et al. .......... 318/400.11 |
| 2009/0322264 A1* | 12/2009 | Imura ....................... 318/400.09 |
| 2010/0026220 A1* | 2/2010 | Sakai ........................ 318/400.17 |
| 2010/0164416 A1* | 7/2010 | Yamada ................... 318/400.13 |
| 2010/0295494 A1* | 11/2010 | Takeuchi et al. .............. 318/504 |
| 2011/0012544 A1* | 1/2011 | Schulz et al. ............ 318/400.02 |
| 2011/0018578 A1* | 1/2011 | Bae et al. .................. 324/764.01 |
| 2011/0133744 A1* | 6/2011 | Ono et al. ...................... 324/430 |
| 2011/0140642 A1* | 6/2011 | Kono et al. ................... 318/139 |
| 2011/0175558 A1* | 7/2011 | Kitanaka ................... 318/400.3 |
| 2011/0181231 A1* | 7/2011 | Ito et al. ........................ 318/801 |
| 2011/0241583 A1* | 10/2011 | He et al. .................. 318/400.09 |
| 2011/0241584 A1* | 10/2011 | He et al. .................. 318/400.09 |
| 2011/0248663 A1* | 10/2011 | Yamakawa et al. ........... 318/805 |
| 2011/0273125 A1* | 11/2011 | Yamada et al. ................ 318/503 |
| 2011/0279071 A1* | 11/2011 | Yamada ................... 318/400.02 |
| 2012/0019176 A1* | 1/2012 | Okamura ....................... 318/376 |
| 2012/0032620 A1* | 2/2012 | Shimada et al. ......... 318/400.09 |
| 2012/0068646 A1* | 3/2012 | Takamatsu et al. ...... 318/400.26 |
| 2012/0139460 A1* | 6/2012 | Senkou et al. ........... 318/400.02 |
| 2012/0173066 A1* | 7/2012 | Yamada et al. ................. 701/22 |

FOREIGN PATENT DOCUMENTS

| | | |
|---|---|---|
| JP | 2008 199864 | 8/2008 |
| JP | 2009-44822 | 2/2009 |
| JP | 2010-11571 | 1/2010 |
| JP | 2010 114969 | 5/2010 |
| WO | 2008 001445 | 1/2008 |

OTHER PUBLICATIONS

U.S. Appl. No. 13/809,674, filed Jan. 11, 2013, Kato, et al.
U.S. Appl. No. 13/809,451, filed Jan. 10, 2013, Kato, et al.
Office Action issued Apr. 9, 2013 in Japanese Application No. 2012-526307 (With English Translation).

* cited by examiner

CONTROL APPARATUS FOR ROTATING MACHINE

TECHNICAL FIELD

The present invention relates to a control apparatus for an AC rotating machine that controls a synchronous motor with a permanent magnet by an inverter without using a position sensor.

BACKGROUND ART

Until now, a control apparatus for an AC rotating machine, when output torque from the AC rotating machine is accurately controlled, has needed to be equipped with a rotor position sensor in order to allow a current to flow into the AC rotating machine based on a rotor position of the machine. However, the rotor position sensor is relatively bulky, which has imposed restriction on its arrangement, and caused bothersome work of connecting control transmission wires for transmitting the sensor output to the control apparatus and an increase in troubles such as wire breaking. In contrast to this, what is called sensorless vector control has already been put into practical use, which enables the rotor position to be indirectly estimated by detecting an induction voltage generated during rotation of the rotor of the AC rotating machine, and based on which, executes high-speed accurate control.

In the sensorless vector control, the induction voltage is generally estimated from an inverter voltage command applied to the AC rotating machine and a detected value of the current flowing through the AC rotating machine. However, the rotor position of the AC rotating machine cannot be found before starting up the inverter; in particular, when the AC rotating machine is rotating at high speed, thereby generating a reverse voltage of high amplitude, undesired torque sometimes has been produced due to unstable current control when restarting the inverter, and in the worst case, the restart has also become unable due to overcurrent protection function.

In order to solve the problem as described above, the sensorless vector control is not executed during a certain period after restarting the inverter, but only current feedback control is executed instead, an approximate value of rotation speed of the AC rotating machine is estimated from rotation speed of the voltage vector or current vector during the period, and following that, the sensorless vector control is started using the estimated value as its initial value. Thereby, the inverter is smoothly restarted even when the AC rotating machine using a permanent magnet is rotating at high speed (see Patent document 1, for example).

PRIOR ART DOCUMENT

Patent Document

Patent Document
 Patent document 1: Japanese Laid-open Patent Publication No. 2005-065410 (see Paragraphs 4 to 7, FIGS. 1 to 2)

SUMMARY OF THE INVENTION

Problem to be Solved by the Invention

By a method, as in a conventional control apparatus for an AC rotating machine, in which only the current feedback control is executed, and the approximate value of rotation speed of the AC rotating machine is estimated based on the rotation speed of the voltage vector or current vector during the period, the induction voltage of the AC rotating machine sometimes becomes not lower than the voltage the inverter can output, when the AC rotating machine is rotating at high speed. In those cases, the problem has been that the current feedback control is made unstable by the method described in Patent document 1.

The present invention has been made aiming at solving the foregoing problem, and providing a control apparatus for an AC rotating machine that can reliably and stably restart the AC rotating machine, particularly a synchronous motor using a permanent magnet, when position-sensorless vector control is executed to it.

Means for Solving the Problem

A control apparatus for an AC rotating machine according to the present invention comprises a' controller that produces voltage commands based on current commands and produces switching commands based on the voltage commands; a power converter that generates an AC voltage based on the switching commands and applies to the AC rotating machine the AC voltage; a voltage detector that detects an input DC voltage to the power converter; and a current detector that detects an AC current flowing through the AC rotating machine; wherein the controller includes a steady speed calculator that calculates, during stable control of the AC rotating machine, a rotation angular frequency of the AC rotating machine based on the AC current and the voltage commands; and a start-up speed calculator that calculates, during start-up control within a predetermined period after the AC rotating machine has been started up, the rotation angular frequency of the AC rotating machine based on the AC current and the voltage commands; and corrects the current commands during the start-up control so that the AC voltage amplitude of the voltage commands will be a constant value not more than the maximum output voltage of the power converter.

Advantage of the Invention

The present invention includes a steady speed calculator that calculates, during stable control of the AC rotating machine, a rotation angular frequency of the AC rotating machine based on the AC current and the voltage commands; and a start-up speed calculator that calculates, during start-up control within the predetermined period after the AC rotating machine has been started up, the rotation angular frequency of the AC rotating machine based on the AC current and the voltage commands; and corrects the current commands during the start-up control so that the AC voltage amplitude of the voltage commands will be the constant value not more than the maximum output voltage of the power converter. Therefore, weakening control can be executed in an overmodulation region in which an unloaded induction voltage of the AC rotating machine becomes not lower than the input DC voltage to the power converter, and unstable control due to overmodulation can be prevented, thereby enabling the AC rotating machine to be reliably and stably started up and controlled.

MODE FOR CARRYING OUT THE INVENTION

Embodiment 1

Figure 1:
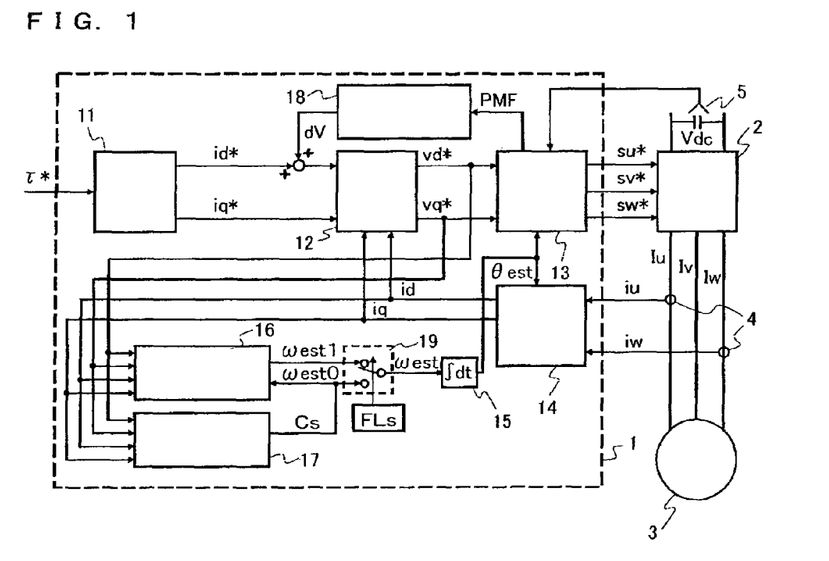
FIG. 1 is a block diagram of a control apparatus for an AC rotating machine according to Embodiment 1 of the present invention.
Figure 2:
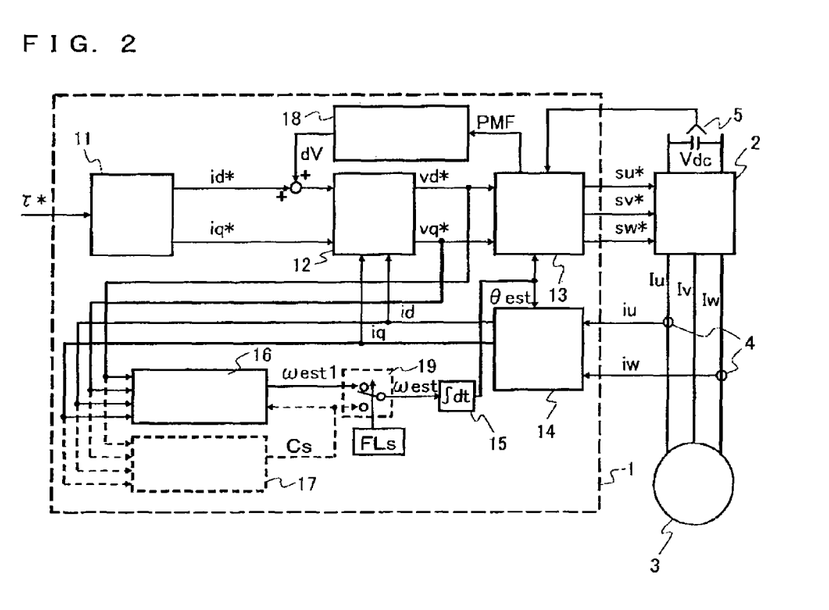
FIG. 2 is a block diagram of the control apparatus for an AC rotating machine according to Embodiment 1 of the invention in steady state control.
Figure 4:
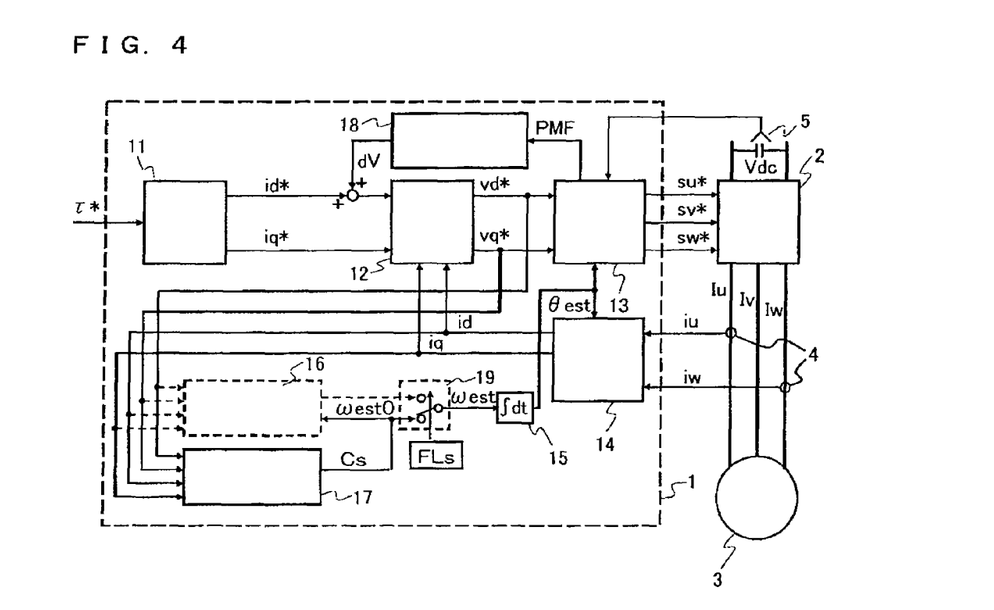
FIG. 4 is a block diagram of the control apparatus for an AC rotating machine according to Embodiment 1 of the invention in start-up control.

FIG. 1 is a block diagram of a control apparatus for an AC rotating machine according to Embodiment 1 of the present invention; FIG. 2 is a block diagram of the control apparatus for an AC rotating machine in steady state control; and FIG. 4 is a block diagram of the control apparatus for an AC rotating machine in start-up control. In FIG. 1, the control apparatus for an AC rotating machine drives and controls an AC rotating machine 3, which comprises a control circuit 1, a power converter (inverter) 2, a current detector 4, and a voltage detector 5.

The control circuit 1 is a controller that produces voltage commands vd* and vq* based on current commands id* and iq*, and switching commands su*, sv* and sw* based on the voltage commands vd* and vq*. The power converter 2 is, for example, a three-phase power converter that performs power conversion between DC power and three-phase AC power, which generates an AC voltage based on the switching commands su*, sv* and sw*, and applies to the AC rotating machine 3 the AC voltage. The power converter 2 includes three-phase conversion circuits for U-phase, V-phase and W-phase with those connected in parallel to one another. As is known in the art, the conversion circuits for U-phase, V-phase and W-phase each include an arm made up of a pair of positive side and negative side switches; three-phase current supply paths Iu, Iv and Iw are connected to connecting points between the pair of switches of each conversion circuit. The power converter 2 is configured as a variable-voltage and variable-frequency three-phase power converter in this Embodiment. When receiving the switching commands su*, sv* and sw* from the control circuit 1 and thereby converting DC power into three-phase AC power, the power converter 2 produces three-phase AC power with a controlled output voltage and frequency based on the switching commands su*, sv* and sw*. The switching commands su*, sv* and sw* are supplied to the conversion circuits for U-phase, V-phase and W-phase, respectively, and the pair of switches of each conversion circuit are turned on and off in a phase controlled based on the switching commands su*, sv* and sw*.

In this Embodiment, the AC rotating machine 3 is a synchronous motor using a permanent magnet and connected to the power converter 2 via the three-phase AC current supply paths Iu, Iv and Iw. The current detector 4 is arranged in the AC current supply paths Iu, Iv and Iw, for example, and detects currents based on AC phase currents flowing from the power converter 2 to the AC rotating machine 3, that is, the U-phase current iu and W-phase current iw. The voltage detector 5 detects the input DC voltage Vdc applied to the power converter 2 on the input side, and which is provided on the input side of the power converter 2, for example, and a voltage sensor is adopted therefor to detect the input DC voltage Vdc.

The control circuit 1 is configured, for usual sensorless vector control, with a control system including the start-up control of the AC rotating machine 3. The control circuit 1 comprises a current command unit 11; a current controller 12; a dq-axis/three-phase coordinate converter 13; a three-phase/dq-axis coordinate converter 14; an integrator 15; a steady speed calculator 16; a start-up speed calculator 17; and voltage clamp controller 18. The current command unit 11 produces the current commands id* and iq from a torque command τ* in the steady state control of the AC rotating machine 3. The current controller 12 produces the voltage commands vd* and vq* from the current commands id* and iq*.

The steady speed calculator 16 estimates, during the steady state control of the AC rotating machine 3, an estimation rotation angular frequency ωest1, which is rotation speed of the AC rotating machine 3 and required for the usual sensorless vector control, from the voltage commands vd* and vq* and current detection values id and iq. The integrator 15 calculates an estimation rotation phase θest from an estimation rotation angular frequency ωest. The start-up speed calculator 17 estimates, from the voltage commands vd* and vq* and current detection values id and iq in the start-up control, a start-up estimation rotation angular frequency ωest0 in the steady state control, during the start-up control (Cs) within a predetermined period (start-up control period SP described later) after the AC rotating machine 3 has been started up. The voltage clamp controller 18 calculates a d-axis current correction value dV that corrects the current command id* based on a modulation ratio PMF relevant to the voltage commands vd* and vq*, and executes control so that the modulation ratio PMF becomes a predetermined ratio. Furthermore, the control circuit 1 is provided with a selector switch 19, and configured in such a way as to choose the estimation rotation angular frequency ωest1 that the steady speed calculator 16 estimates by a start-up control flag (FLs) or the start-up estimation rotation angular frequency ωest0 estimated by the start-up speed calculator 17, and by switching over only the estimation rotation angular frequency ωest, to selectively switch between the steady state control and start-up control.

Next, power conversion at the power converter 2, which is controlled by the control circuit 1, will be explained in detail. There are three control systems as a typical power conversion system; they are a sine wave PWM (pulse width modulation) control system, a rectangular wave control system and an overmodulation PWM control system. The sine wave PWM control system is generally used as a PWM control system, in which switching elements of arms for each phase are turned on and off depending on voltage comparison of a sinusoidal voltage command value with a carrier wave (typically triangular wave). As a result, duty ratios of sets of high-level periods corresponding to on-periods of upper arm switching elements and low-level periods corresponding to on-periods of their respective lower arm switching elements are controlled in such a way that the fundamental wave component becomes a sine wave within a certain period. As is known in the art, the modulation ratio PMF in the sine wave PWM control system, which is a ratio of the amplitude of the fundamental wave component to the input voltage Vdc to the power converter 2, cannot be raised exceeding 0.78 times thereof.

On the other hand, in the rectangular wave control system, a rectangular wave pulse whose ratio of the high-level and low-level periods is 1:1 is applied to the AC rotating machine within the certain period described above. The modulation ratio PMF can be thereby raised up to 1. Moreover, the overmodulation PWM control system is the one in which the amplitude of the sinusoidal voltage command value is greater than that of the carrier wave, and executes the same PWM control as the sine wave PWM control system, with the amplitude of the voltage command value being distorted to contract. Since the fundamental wave component can be distorted, the modulation ratio PMF can be raised in the range between 0.78 and 1.

In the AC rotating machine 3, since the higher the rotation speed and torque increase, the higher the induction voltage of the AC rotating machine 3 becomes, the voltage commands from the power converter 2 need to be increased. Therefore, in the steady state control, the sine wave PWM control system is employed in a range in which the induction voltage is lower than the maximum output voltage of power converter 2; meanwhile when the voltage commands further increase, current control of the AC rotating machine is executed in accordance with vector control by the overmodulation PWM control system. On the other hand, when the induction voltage reaches the maximum output voltage of the power converter 2, the rectangular wave control system is adopted in accordance with field-weakening control, with the maximum output voltage maintained intact.

However, in the start-up control, the current control of the AC rotating machine 3 needs to be executed under conditions that the free-running speed and phase of the AC rotating machine 3 are unknown, and the current control of the AC rotating machine 3 needs to be reliably executed compared to the steady state control. In this respect, since the sine wave PWM control system performs switching once in half a period of the carrier wave, the system can execute the current control with a control response as designed. However, in the overmodulation PWM control system, the fundamental wave of the voltage commands is greater than the carrier wave, and switching elements of the power converter 2 are not turned on and off during that period; therefore current control response is lowered. When the start-up control is executed using an overmodulation PWM control system such as above, the control system is made unstable, and the start-up control cannot be executed.

Therefore in this Embodiment, in order to execute reliably in the start-up control the current control of the AC rotating machine 3 and enable the current control in the start-up control to be executed without fail by the sine wave PWM control system, the current command id* is corrected during the start-up control so that the AC voltage amplitude of the voltage commands vd* and vq* will be a constant value not more than the maximum output voltage of the power converter 2. More specifically, the voltage clamp controller 18 described later calculates the d-axis current correction value dV that corrects the current command id* so that the modulation ratio PMF during the start-up control becomes not more than 1 or 0.78 (√6/π), and executes flux-weakening control in the start-up control, thereby realizing stable start-up control.

Here, the maximum output voltage of power converter (maximum instantaneous amplitude of three phase AC voltage) becomes Vdc 2/π with respect to the input DC voltage Vdc to the power converter 2. This corresponds to the modulation ratio PMF=1. Moreover, when the modulation ratio PMF is made 0.78 (√6/π), the maximum output voltage of the power converter 2 becomes a value of Vdc×1/2. Therefore, in order to make the modulation ratio PMF not more than 1, the current command id* only has to be corrected so that the AC voltage amplitude of the voltage commands vd* and vq* during the start-up control becomes not more than 2/π times the input DC voltage Vdc to the power converter 2. In addition, in order to make the modulation ratio PMF not more than 0.78(√6/π), the current command id* only has to be corrected so that the AC voltage amplitude of the voltage commands vd* and vq* during the start-up control will be a value not more than one half of the input DC voltage Vdc to the power converter 2.

The operation of the control apparatus for an AC rotating machine will be explained next. Firstly, the operation of sensorless vector control in the steady state control will be explained, followed by that of the start-up control. To begin with, the operation of the control apparatus for an AC rotating machine in the steady state control will be explained referring to FIG. 2. FIG. 2 shows by broken lines parts that do not operate in the steady state control, out of those in the block diagram of the control apparatus for an AC rotating machine shown in FIG. 1. The steady state control of the control apparatus for an AC rotating machine is executed through paths shown by solid lines in FIG. 2.

The current command unit 11 produces the current commands id* and iq* on receiving the torque command τ*, and then supplies these current commands id* and iq* to the current controller 12. Upon receiving the current commands id* and iq* from the current command unit 11, the d-axis current correction value dV from the voltage clamp controller 18 described later, and the d-axis current detection value id and q-axis current detection value iq from the three-phase/dq-axis coordinate converter 14 described later, the current controller 12 produces the d-axis voltage command vd* and q-axis voltage command vq* in such a way that the d-axis current detection value id is equal to the sum of the d-axis current commands id* and d-axis current correction value dV, and the q-axis current detection value iq equal to the q-axis current command iq*.

The dq-axis/three-phase coordinate converter 13 is a coordinate converter that converts from a rotational biaxial coordinates including the d-axis and q-axis that are perpendicular to each other to a three-phase time coordinates. Upon receiving the voltage commands vd* and vq* from the current controller 12, the estimation rotation phase θest from the integrator 15 described later, and the input DC voltage Vdc, which is a voltage detection value from the voltage detector 5, the dq-axis/three-phase coordinate converter 13 calculates using Equation (1) the modulation ratio PMF of the terminal voltage applied to the AC rotating machine 3.

[Formula 1]

$$PMF = \frac{\sqrt{(vd^*)^2 + (vq^*)^2}}{\frac{\sqrt{6}}{\pi} Vdc} \quad (1)$$

By calculating the modulation ratio PMF as described above, the ratio PMF can be calculated to be 1 in the rectangular wave control system. The dq-axis/three-phase coordinate converter 13 produces the switching commands su*, sv* and sw* from this modulation ratio PMF. These switching commands su*, sv* and sw* are supplied to the power converter 2.

The three-phase/dq-axis coordinate converter 14 is a coordinate converter that converts from the three-phase time coordinates to the rotational biaxial coordinates including the d-axis and q-axis that are perpendicular to each other. Upon receiving detection currents (AC currents) iu and iw from the current detector 4 and the estimation rotation phase θest from the integrator 15 described later, the three-phase/dq-axis coordinate converter 14 converts those into the d-axis current detection value id and q-axis current detection value iq on the rotational biaxial coordinates including the d-axis and q-axis perpendicular to each other. The integrator 15 integrates its values from the estimation rotation angular frequency ωest calculated by the steady speed calculator 16, so as to calculate the estimation rotation phase θest, and supplies the result to the dq-axis/three-phase coordinate converter 13 and three-phase/dq-axis coordinate converter 14. The steady speed calculator 16 estimates the rotation angular frequency by an adaptive observer, which calculates the estimation rotation angular frequency ωest1 based on the d-axis current detection value id and q-axis current detection value iq on the rotational biaxial coordinates and the voltage commands vd* and vq*, and supplies the result to the integrator 15.

Figure 3:
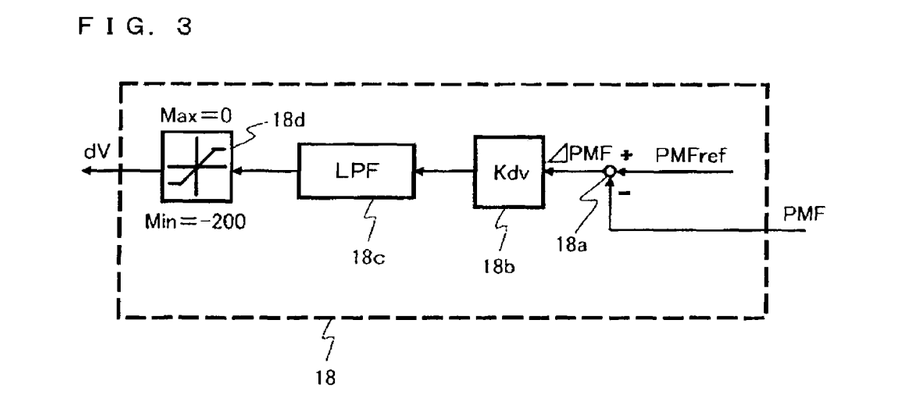
FIG. 3 is a block diagram of a voltage clamp controller according to Embodiment 1 of the invention.

The voltage clamp controller 18, in order for the modulation ratio PMF calculated by the dq-axis/three-phase coordinate converter 13 to become a desired modulation ratio command value PMFref, calculates the d-axis current correction value dV as described below. FIG. 3 is a block diagram showing a configurational example of the voltage clamp controller. The voltage clamp controller 18 may be provided with a limiter so that the modulation ratio command value PMFref will not be overmodulation. For example, an upper limit of the modulation ratio PMF during the steady state control in which synchronous pulse control is executed should be set higher than that of the modulation ratio PMF during the start-up control in which asynchronous control is executed, for example. In other words, it is preferable that a maximum-setting value of the AC voltage amplitude of the voltage commands during the steady state control and maximum setting value of the AC voltage amplitude of the voltage commands during the start-up control be switched therebetween, and the maximum setting value of the AC voltage amplitude of the voltage commands during the steady state control be set higher than the other. As an example, the maximum setting value of the AC voltage amplitude of the voltage commands during the steady state control is set to a value of $2/\pi$ times the input DC voltage to the power converter, and the maximum setting value of the AC voltage amplitude of the voltage commands during the start-up control to one half of the input DC voltage. Thereby, PMFref will be set to some 0.78 in the asynchronous control, and some 1.0 in the synchronous pulse control.

Firstly, the modulation ratio PMF is subtracted from PMFref by an adder-subtractor 18a, as given by Equation (2), to calculate a modulation ratio deviation ΔPMF.

$$\Delta PMF = PMFref - PMF \qquad (2)$$

The calculated modulation ratio deviation ΔPMF is input to a weakening control gain unit 18b, its output is passed through a low pass filter 18c and limiting circuit 18d, and then calculated as the d-axis current correction value dV. The cut-off frequency of the low pass filter 18c is set to a few rad/s here in this voltage clamp controller 18 shown in FIG. 3. The cut-off frequency is set to, for example, 2π rad/s in this Embodiment. Moreover, the limiting circuit 18d limits the d-axis current correction value dV so as not to take a positive value. The flux-weakening control is executed through operation such as the above, enabling the AC rotating machine 3 to be operated in a higher speed region.

Additionally, when the AC rotating machine 3 is controlled through the configuration shown in FIG. 2, initial values of the d-axis current correction value dV, the estimation rotation angular frequency ωest and the estimation rotation phase θest are required in order to start operation of the AC rotating machine 3. These three initial values can be obtained by executing the start-up control described later.

Next, the operation of the control apparatus for the AC rotating machine in the start-up control will be explained referring to FIG. 4. FIG. 4 shows by broken lines parts that do not operate in the start-up control, out of those in the block diagram of the control apparatus for an AC rotating machine shown in FIG. 1. The start-up control of the AC rotating machine is executed through paths shown by solid lines in FIG. 4. This start-up control is executed when the power converter 2 is started up, after the time when the power converter 2 has stopped power conversion operation and the AC rotating machine 3 thereby goes into a free-running state, so as to start the power conversion operation, and then the AC rotating machine 3 is started up by this power converter 2.

Figure 5:
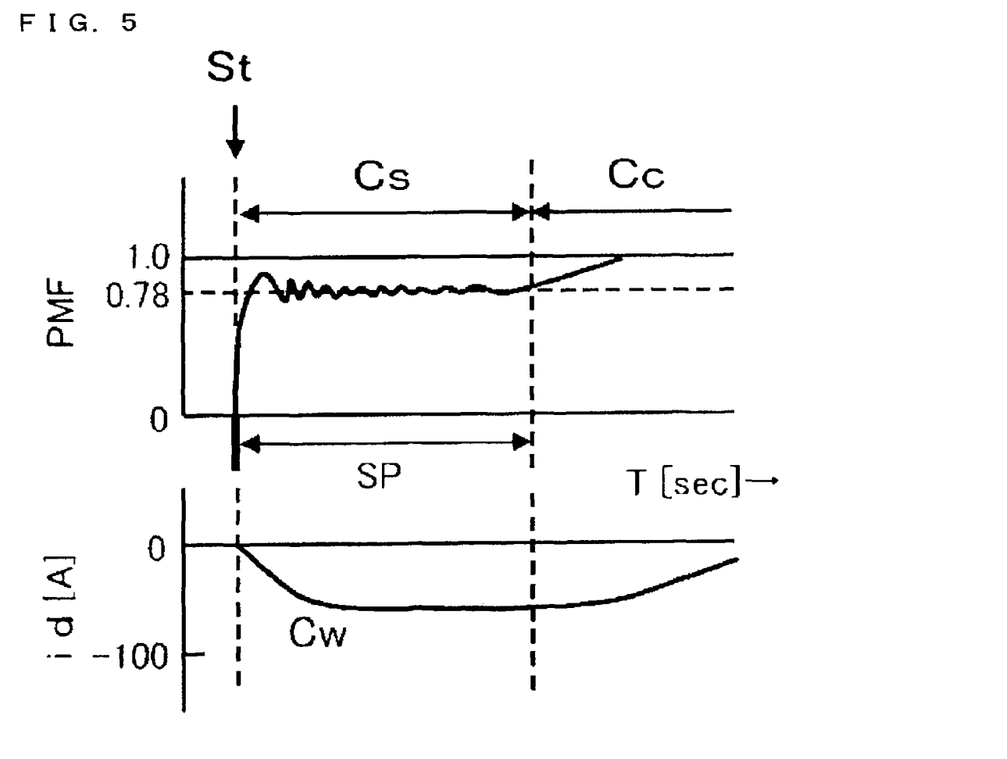
FIG. 5 is a time chart for a modulation ratio and d-axis current according to Embodiment 1 of the invention.

More specifically, letting the start-up control period after starting up the power converter 2 be SP [sec] in the start-up control, during which the control apparatus for an AC rotating machine is operated through the configuration shown by solid lines in FIG. 4, and the start-up estimation rotation angular frequency ωest0 is calculated. FIG. 5 is a diagram showing a time chart for the modulation ratio PMF and d-axis current id at the start up. In FIG. 5, the start-up control (Cs) is executed during the start-up control period SP after the start-up (St) of the AC rotating machine 3, and following that, switched to the steady state-control (Cc). The modulation ratio PMF rises up immediately after the start-up, and settles down to 0.78 while rippling. When the control is switched to the steady state control, the modulation ratio PMF nears 1. Moreover, since the control circuit 1 executes weakening control (Cw) in the start-up control, the d-axis current id flows briefly in the negative direction. Here, the start-up control period SP is several tens to several hundreds of milliseconds, which is set to, for example, 100 [msec] in this Embodiment.

By switching between the start-up control and steady state control, the start-up estimation rotation angular frequency ωest0 that the start-up speed calculator 17 produces during the start-up control is set as an initial value of the estimation rotation angular frequency ωest. Additionally, the start-up estimation rotation angular frequency ωest0 that the start-up speed calculator 17 produces is also input to the steady speed calculator 16, which can be used as an initial value of the estimation rotation angular frequency ωest1 when starting the steady state control. Moreover, output from the integrator 15, which is calculated based on the start-up estimation rotation angular frequency ωest°, is set as an initial value of the estimation rotation phase θest in the steady state control. Furthermore, the d-axis current correction value dV that the voltage clamp controller 18 calculates during the start-up control can be set as an initial value of the d-axis current correction value dV in the steady state control. Thereby, in the configuration of the control apparatus for an AC rotating machine shown in FIG. 2, the initial values of the d-axis current correction value dV, the estimation rotation angular frequency ωest and the estimation rotation phase θest can be obtained that are required for starting operation of the AC rotating machine 3 rotating at high speed, so that control can be smoothly moved into the steady state control.

Here, the operation of the start-up control will be explained. In FIG. 4, the current command unit 11, on receiving the torque command τ*, produces the current commands id* and iq* during the start-up control. These current commands id* and iq* are commands such that the AC rotating machine 3 does not produce torque during the start-up control; if τ* is set as τ*=0, for example, during the start-up control, the current commands are set as id*=0 and iq*=0.

The current command unit 11 supplies these current commands id* and iq* to the current controller 12 during the start-up control.

Upon receiving the current commands id* and iq* from the current command unit 11, the d-axis current correction value dV from the voltage clamp controller 18, and the d-axis current detection value id and q-axis current detection value iq from the three-phase/dq-axis coordinate converter 14, the current controller 12 produces the d-axis voltage command vd* and q-axis voltage command vq* in such a way that the d-axis current detection value id is equal to the sum of the d-axis current command id* and d-axis current correction value dV, and the q-axis current detection value iq equal to the q-axis current command iq*. Additionally, the current controller 12 during the start-up control needs relatively high frequency response with respect to the free-running frequency of the AC rotating machine 3. In this Embodiment, if the free-running frequency of the AC rotating machine 3 is an electrical angular frequency of 300 Hz, the current control response of the current controller 12 is set to not lower than 300 Hz.

Upon receiving the voltage commands vd* and vq* from the current controller 12, the estimation rotation phase ωest from the integrator 15, and the input DC voltage Vdc from the voltage detector 5, the dq-axis/three-phase coordinate converter 13 produces the switching commands su*, sv* and sw*. These switching commands su*, sv* and sw* are supplied to the power converter 2. On receiving the detection currents iu and iw from the current detector 4 and the estimation rotation phase θest from the integrator 15, the three-phase/dq-axis coordinate converter 14 converts those into the d-axis currant detection value id and q-axis current detection value iq on the rotational biaxial coordinates including the d-axis and q-axis that are perpendicular to each other. In this start-up control period SP, the three-phase AC currents iu, iv and iw that flow from the power converter 2 to the AC rotating machine 3 are controlled so as to make the torque zero; therefore, unnecessary torque is not produced during the start-up control, so that the AC rotating machine 3 can be stably started up.

Figure 6:
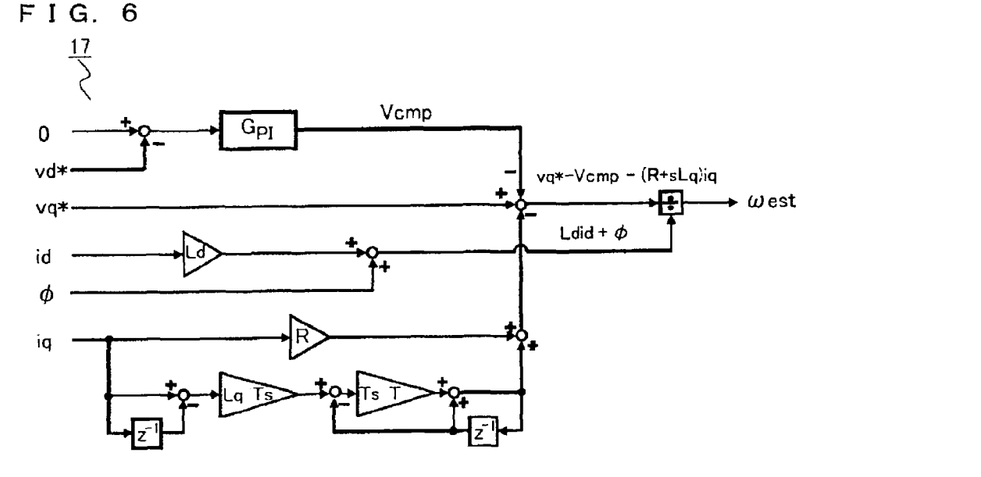
FIG. 6 is a block diagram of a start-up speed calculator according to Embodiment 1 of the invention.

Next, a method of calculating the estimation rotation phase θest supplied to the dq-axis/three-phase coordinate converter 13 and three-phase/dq-axis coordinate converter 14 will be explained. FIG. 6 is a block diagram showing the configuration of the start-up speed calculator 17. In FIG. 6, Ts is an S/W calculation period and T=1/ωc [s/rad], the inverse number of a cut-off frequency. The start-up speed calculator 17 estimates the rotation angular frequency ωest at the start of the steady state control, from the voltage commands vd* and vq* in the start-up control and current detection values id and iq. By integrating the estimated rotation angular frequency ωest by the integrator 15, the start-up speed calculator-estimates during the start-up control the estimation rotation phase θest, that is, the rotation phase of the AC rotating machine 3.

When the AC rotating machine 3 is a synchronous motor using a permanent magnet, the voltage equation on the dq-axis can be expressed by Equation (3). Since Equations (3a) and (3b) can be obtained by expanding Equation (3), a rotation angular frequency ω can be expressed as Equation (4) from Equation (3a) and Equation (5) from Equation (3b).

[Formula 2]

$$\begin{bmatrix} vd \\ vq \end{bmatrix} = \begin{bmatrix} R+sLd & -\omega Lq \\ \omega Ld & R+sLq \end{bmatrix} \begin{bmatrix} id \\ iq \end{bmatrix} + \begin{bmatrix} 0 \\ \omega\phi \end{bmatrix} \quad (3)$$

[Formula 3]

$$\begin{cases} vd = (R+sLd)id - \omega Lq iq & (3a) \\ vq = \omega Ld id + (R+sLq)iq + \omega\phi & (3b) \end{cases}$$

[Formula 4]

$$\omega = \frac{(R+sLd)id - vd}{Lq iq} \quad (4)$$

[Formula 5]

$$\omega = \frac{vq - (R+sLq)iq}{Ld id + \phi} \quad (5)$$

where, R is the armature resistance of the AC rotating machine 3; Ld, the inductance of a d-axis component; Lq, the inductance of a q-axis component; Φ, armature linkage flux by a permanent magnet; ω, the rotation angular frequency of the AC rotating machine 3; and s, a Laplacian operator. There exist two operational equations for the rotation angular frequency ω from Equations (4) and (5); however, calculation using Equation (5) would be better, if divide by zero and the like is taken into consideration. By using voltage command vq* instead of vq in Equation (5), the estimation rotation angular frequency ωest that rotates in synchronization with the magnet position of the synchronous motor using a permanent magnet and the estimation rotation phase θest can be estimated using Equations (6) and (7), respectively.

[Formula 6]

$$\omega est = \frac{vq^* - (R+sLq)iq}{Ld id + \phi} \quad (6)$$

[Formula 7]

$$\theta est = \int \omega est \, dt \quad (7)$$

However, since Equation (6) includes a differential term, it is preferable to configure an actual control system, including pseudo-differential as Equation (8) taking noise and the like into consideration.

[Formula 8]

$$s \cong \frac{s}{Ts+1} \quad (8)$$

where, T is an integral time constant and s, the Laplacian operator. Furthermore in order to enhance stability in the start-up control, a compensation voltage Vcmp is calculated by Equation (9), Equation (6) is modified, and then the rotation angular frequency is estimated by Equation (10).

[Formula 9]

$$\text{Vcmp} = G_{PI}(0 - vd^*) \quad (9)$$

[Formula 10]

$$\omega est = \frac{vq^* + Vcmp - (R + sLq)iq}{Ldid + \phi} \quad \text{if clockwise} \qquad (10)$$

$$\omega est = \frac{vq^* - Vcmp - (R + sLq)iq}{Ldid + \phi} \quad \text{if counterclockwise}$$

where, $G_{p1}$ is a proportional integral gain. As described above, phase information supplied to the dq-axis/three-phase coordinate converter 13 and three-phase/dq-axis coordinate converter 14 is calculated, and thereby the dq-axis/three-phase coordinate converter 13 and three-phase/dq-axis coordinate converter 14 perform coordinate conversion, whereby stable start-up control can be executed, and the AC rotating machine 3 can be stably started up.

The operation of the voltage clamp controller 18 will be explained next. The voltage clamp controller 18 calculates the d-axis current correction value dV, as with the case of the steady state control, so that the modulation ratio PMF calculated by the dq-axis/three-phase coordinate converter 13 will be a desired modulation ratio command value PMFref. As for the configuration of the voltage clamp controller 18, the same configuration as that for the steady state control is used. However, a certain level of current control response is required in the start-up control; therefore, asynchronous PWM modulation is generally used. In this case, it is preferable to set PMFref to not more than 0.78 so that the modulation ratio command value PMFref will not become overmodulation. Thereby, the voltage clamp controller 18 operates as if it is a limiter to the modulation ratio PMF. In addition, there is no particular change in moving into the steady state control, and control can be moved into the steady state control without changing the control system, while maintaining the d-axis current correction value dV obtained by the start-up control.

By the way, when the weakening control and then the start-up control are executed, in addition to the estimated rotation angular frequency and rotation phase angle, a current-weakening command value is set as the initial value of the d-axis current correction value dV, whereby the sensorless vector control of the AC rotating machine 3 can be started while executing the flux-weakening control.

As described above, the start-up speed calculator 17 calculates during the start-up control the start-up estimation rotation angular frequency ωest0; therefore, the AC voltage amplitude of the voltage commands vd* and vq* can be made a constant value not more than the maximum output voltage of the power converter 2, without depending on conditions of the input DC voltage to the power converter 2 and the rotation angular frequency of the AC rotating machine 3. In other words, a current-weakening command enabling the modulation ratio PMF to be constant can be produced. The d-axis current command id* is corrected by this current-weakening command, and the start-up control is executed based on the resultant d-axis current Command id*, whereby the start-up control can be executed, while executing field-weakening control. Moreover, by making the modulation ratio PMF the ratio of the amplitude of voltage commands that the control circuit 1 produces to the input DC voltage to the power converter 2, the AC rotating machine 3 can be supplied with the same voltages as the voltage commands even when the input DC voltage to the power converter 2 fluctuates, and the field-weakening control can be reliably executed, so that reliable and stable start-up control of the AC rotating machine 3 can be realized.

Moreover, even in an overmodulation PWM modulation region in which the AC rotating machine 3 rotates at high speed and the unloaded induction voltage of the AC rotating machine 3 exceeds the input DC voltage Vdc to the power converter 2, the weakening control is executed so that the AC voltage amplitude of the voltage commands vd* and vq* becomes a constant value not more than the maximum output voltage of the power converter 2, that is, the modulation ratio PMF becomes not more than 1, whereby unstable control due to overmodulation can be prevented, and reliable and stable start-up control of the AC rotating machine 3 can be realized. Therefore, when position-sensorless vector control of an AC rotating machine 3, particularly of a synchronous motor using a permanent magnet, is executed, emphasis is placed on response in the start-up control, enabling reliable and stable restart; meanwhile in the steady state control, control is executed with emphasis placed on efficiency.

Furthermore, when the induction voltage of the AC rotating machine 3 reaches the maximum value of the output voltage from the power converter 2, the rectangular wave control system in accordance with the field-weakening control is sometimes adopted while maintaining the maximum voltage. In this case, the control circuit 1 defines the maximum value of the AC voltage amplitude that the rectangular wave control system can output as the input DC voltage Vdc to the power converter 2, and the modulation ratio PMF is set to 1. Thereby, the field-weakening control can be reliably executed, and reliable and stable start-up control of the AC rotating machine 3 can be realized.

Embodiment 2

Figure 7:
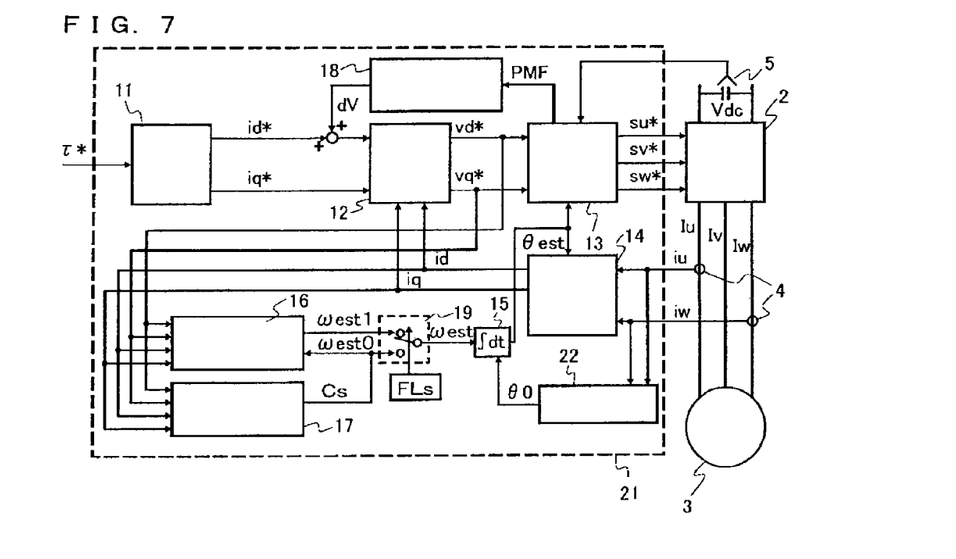
FIG. 7 is a block diagram of a control apparatus for an AC rotating machine according to Embodiment 2 of the invention.

FIG. 7 is a block diagram of a control apparatus for an AC rotating machine according to Embodiment 2 of the invention. In FIG. 7, Embodiment 2 differs from Embodiment 1 in that a starting-phase setting unit 22 is provided in a control circuit 21. Other than that, the configuration is the same as that of Embodiment 1; parts with the same reference numerals as those in FIG. 1 are the same or corresponding ones. The starting-phase setting unit 22 calculates an energization-start rotation phase θ0 of the AC rotating machine 3 when the start-up control is started based on the detection currents iu and iw that are AC currents flowing through the AC rotating machine 3.

Figure 8:
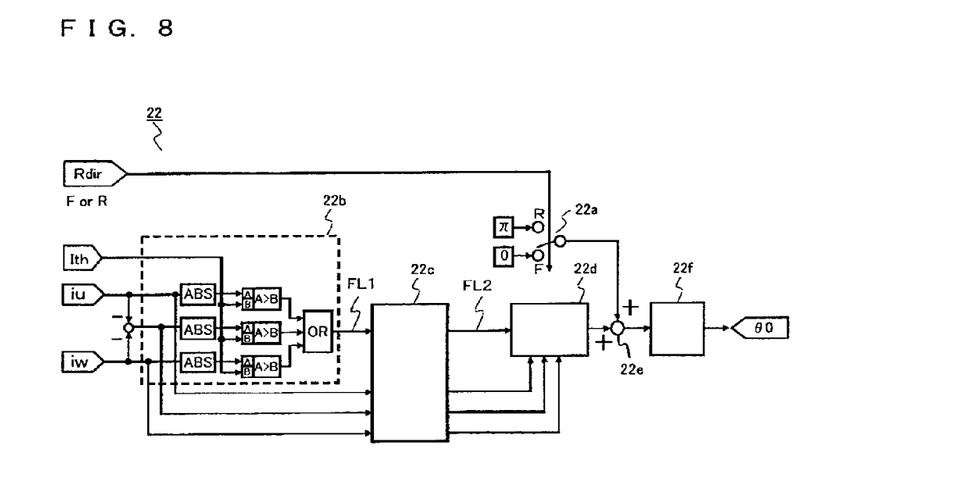
FIG. 8 is a block diagram of a starting-phase setting unit according to Embodiment 2 of the invention.

FIG. 8 shows a configurational example of the starting-phase setting unit 22. The starting-phase setting unit 22 shown in FIG. 8 is configured to output the energization-start rotation phase θ0 at the start of the start-up control is started, from the detection currents iu and iw on the rotational coordinates. More specifically, the starting-phase setting unit 22 comprises, a comparison circuit 22b; a sample-and-hold circuit 22c; a table lookup circuit 22d; a selector switch 22a; an adder 22e; and a phase-adjusting circuit 22f. The comparison circuit 22b compares the detection currents iu and iw with a current threshold value (Ith), and raises a flag 1 (FL 1) when detecting one of the phase currents exceeding the current threshold value. Then the circuit raises a flag 2 (FL2) via the sample-and-hold circuit 22c; the table lookup circuit 22d looks up a table describing the relation between the phase of the AC rotating machine 3 and the three-phase AC currents iu, iv and iw immediately after the start-up control has been started. The selector switch 22a selects a correction value depending on whether the rotation direction (Rdir) of the AC rotating machine 3 is clockwise (F) or counterclockwise (R). When the direction is clockwise, the correction value becomes zero; whereas when counterclockwise, the value becomes n. The adder 22e adds the phase obtained by the table lookup circuit 22d and the correction value selected by the selector switch 22a; the phase-adjusting circuit 22f adjusts the phase, and the energization-start rotation phase θ0 is set. In this way, the starting-phase setting unit 22 can calculate the energization-start rotation phase θ0 within a predetermined period after the AC rotating machine 3 has been started up, based on the three-phase AC currents iu, iv and iw.

The starting-phase setting unit 22 sets the energization-start rotation phase θ0, whereby the energization-start rotation phase can be set accurately with an accuracy of, for example, 60° steps, from current behavior during a sufficiently short time compared to the start-up control period SP after the power converter 2 has been started up; therefore, fluctuation in the current amplitude and torque shock immediately after the start-up control has been started can be reduced, thereby enabling reliable and stable restart. Therefore, in the overmodulation PWM modulation region in which the AC rotating machine 3 rotates at high speed, and its unloaded induction voltage exceeds the input DC voltage Vdc to the power converter 2, when the weakening control is executed so that the modulation ratio PMF will be not more than 1, the rotation phase can be obtained in a short time after starting the start-up, and the modulation ratio PMF is enabled to converge to a constant value more quickly.

DESCRIPTION OF THE REFERENCE NUMERALS 1, 21: control circuit
2: power converter
3: AC rotating machine
4: current detector
5: voltage detector
11: current command unit
12: current controller
13: dq-axis/three-phase coordinate converter
14: three-phase/dq-axis coordinate converter
15: integrator
16: steady speed calculator
17: start-up speed calculator
18: voltage clamp controller
19: selector switch
22: starting-phase setting unit

The invention claimed is:

1. A control apparatus for an AC rotating machine, comprising:
   a controller that produces a voltage command based on a current command and produces a switching command based on the voltage command;
   a power converter that generates an AC voltage based on the switching command and applies to the AC rotating machine the AC voltage;
   a voltage detector that detects an input DC voltage to the power converter; and
   a current detector that detects an AC current flowing through the AC rotating machine; wherein
   the controller executes to the AC rotating machine in a free-running state start-up control that starts up the power converter and thereby starts up the AC rotating machine; executes field-weakening control by calculating, during a start-up period after the power converter has been started up until a predetermined time passes, a correction value of the current command, from an AC voltage amplitude of the voltage command, so that the AC voltage amplitude of the voltage command will be a constant value not more than a maximum output voltage of the power converter; and calculates a rotation angular frequency of the AC rotating machine based on the AC current and the voltage command.

2. A control apparatus for an AC rotating machine according to claim 1, wherein the AC voltage amplitude of the voltage command during the start-up control is a value not more than $2/\pi$ times the input DC voltage to the power converter.

3. A control apparatus for an AC rotating machine according to claim 1, wherein the AC voltage amplitude of the voltage command during the start-up control is a value not more than half the input DC voltage to the power converter.

4. A control apparatus for an AC rotating machine according to claim 1, wherein the controller selectively switches between a maximum setting value of the AC voltage amplitude of the voltage command during the steady state control and a maximum setting value of the AC voltage amplitude of the voltage command during the start-up control.

5. A control apparatus for an AC rotating machine according to claim 4, wherein the controller sets the maximum setting value of the AC voltage amplitude of the voltage command during the steady state control to a value of $2/\pi$ times the input DC voltage to the voltage converter, and sets the maximum setting value of the AC voltage amplitude of the voltage command during the start-up control to a value of half the input DC voltage to the voltage converter.

6. A control apparatus for an AC rotating machine according to claim 1, wherein the controller includes a starting-phase setting unit, and the starting-phase setting unit calculates, during the start-up control within the predetermined time after the AC rotating machine has been started up, a rotation phase of the AC rotating machine based on the AC current.

7. A control apparatus for an AC rotating machine according to claim 2, wherein the controller includes a starting-phase setting unit, and the starting-phase setting unit calculates, during the start-up control within the predetermined time after the AC rotating machine has been started up, a rotation phase of the AC rotating machine based on the AC current.

8. A control apparatus for an AC rotating machine according to claim 3, wherein the controller includes a starting-phase setting unit, and the starting-phase setting unit calculates, during the start-up control within the predetermined time after the AC rotating machine has been started up, a rotation phase of the AC rotating machine based on the AC current.

9. A control apparatus for an AC rotating machine according to claim 4, wherein the controller includes a starting-phase setting unit, and the starting-phase setting unit calculates, during the start-up control within the predetermined time after the AC rotating machine has been started up, a rotation phase of the AC rotating machine based on the AC current.

10. A control apparatus for an AC rotating machine according to claim 5, wherein the controller includes a starting-phase setting unit, and the starting-phase setting unit calculates, during the start-up control within the predetermined time after the AC rotating machine has been started up, a rotation phase of the AC rotating machine based on the AC current.

* * * * *